United States Patent [19]

Borgers et al.

[11] Patent Number: 4,849,812
[45] Date of Patent: Jul. 18, 1989

[54] TELEVISION SYSTEM IN WHICH DIGITIZED PICTURE SIGNALS SUBJECTED TO A TRANSFORM CODING ARE TRANSMITTED FROM AN ENCODING STATION TO A DECODING STATION

[75] Inventors: Stephanus M. C. Borgers; Roeland P. De Bruijne; Peter H. M. De With, all of Eindhoven, Netherlands

[73] Assignee: U.S. Philips Corporation, New York, N.Y.

[21] Appl. No.: 160,053

[22] Filed: Feb. 24, 1988

[30] Foreign Application Priority Data

Mar. 10, 1987 [NL] Netherlands .......................... 8700565

[51] Int. Cl.[4] ...................... H06N 7/133; H06N 7/137
[52] U.S. Cl. .................................... 358/133; 358/105; 358/135; 358/136; 375/27
[58] Field of Search ................ 358/133, 105, 135, 136; 375/27

[56] References Cited

U.S. PATENT DOCUMENTS

| | | | |
|---|---|---|---|
| 4,398,217 | 8/1983 | Peters | 358/133 |
| 4,571,618 | 2/1986 | Hatori | 358/136 |
| 4,591,909 | 5/1986 | Kuroda | 358/136 |
| 4,698,672 | 10/1987 | Chen | 358/136 |
| 4,704,628 | 11/1987 | Chen | 358/136 |
| 4,710,813 | 12/1987 | Wallis | 358/136 |
| 4,722,002 | 1/1988 | Mochizuki | 358/133 |
| 4,723,161 | 2/1988 | Koga | 358/136 |
| 4,727,421 | 2/1988 | Koga | 358/133 |

Primary Examiner—Howard W. Britton
Attorney, Agent, or Firm—Edward W. Goodman

[57] ABSTRACT

Television system in which digitalized picture signals subjected to a transform coding are transmitted from an encoding station to a decoding station. In a television system a digital picture signal is subjected to a transform coding for the purpose of bit rate reduction. In order to detect motion effects between the two fields of a picture, these fields are also examined in a motion detector 8310. If no motion is detected, intraframe transform is employed and if motion is detected intrafield transform is employed. Small motion effects can be eliminated by subjecting the picture signal to a median filtering before subjecting it to an intraframe transform.

6 Claims, 6 Drawing Sheets

II  III

TELEVISION SYSTEM IN WHICH DIGITIZED PICTURE SIGNALS SUBJECTED TO A TRANSFORM CODING ARE TRANSMITTED FROM AN ENCODING STATION TO A DECODING STATION

BACKGROUND OF THE INVENTION

1. Field of the Invention

The invention generally relates to a television system in which digitized television signals are transmitted from an encoding station to a decoding station. More particularly, the invention relates to a television system in which the encoding station is provided with an encoding circuit adapted to perform a transform coding in which groups of picture signal samples are converted into respective groups of coefficients which are transferred to the decoding station. To recover the original television signal samples, this decoding station includes a decoding circuit which is adapted to subject each group of coefficients to an inverse transform.

A system of this type may form part of a television broadcasting system. In that case, the encoding station is incorporated in the television broadcasting transmitter and each TV receiver is provided with a decoding station. In such a case a TV channel is used for transmitting the digitized television signals.

Alternatively, such a system may form part of a video recorder in which case a video tape is used for transmitting the digitized television signals from the encoding station to the decoding station.

2. Description of the Prior Art

As is generally known, a number of fundamental methods of encoding a digital television signal are available to those skilled in the art, such as:

(a) Predictive coding, abbreviated PC;
(b) Transform coding, abbreviated TC.

For performing each of these methods, the television signal is first sampled at a frequency which is usually twice as high as the highest frequency in the signal. This sampling frequency is equal to approximately 10 MHz for a television signal having a bandwidth of approximately 5 MHz. If each sample thus obtained is converted by means of pulse code modulation into an 8-bit PCM word, this yields a bit rate of approximately 80 M bit/second. In practice this bit rate is found to be unacceptably high. In fact, this bit rate requires a transmission channel having a bnadwidth of approximately 40 MHz, which bandwidth is not present in a TV broadcasting channel, let along on a video tape.

A considerably reduction of this bit rate can be obtained by subjecting the PCM words to a predictive coding. As is generally known, see for example reference 1, pages 378-390, a prediction word is subtracted from each PCM word and the difference thus obtained is again subjected to a pulse code modulation. Since 4-bit code words are usually adequate for the representation of these differences, the bit rate is reduced by 50%.

As an alternative to this predictive coding, the PCM words may be subjected to a transform coding, see for example Reference 1, pages 390-396. As is generally known, the television picture is then split up into sub-pictures of NxN pixels. Each sub-picture is subsequently considered as a sum of a plurality of mutually orthogonal basic pictures $B(i,k)$; $i, k = 1, 2, ... N$, each with its own weighting factor $y(i, k)$. As is common practice, these weighting factors will be referred to as coefficients. They are transmitted to the decoding station.

In order to transmit these coefficients to the decoding station with the lowest possible bit rate, they are first subjected to an adaptive coding (see for example reference 2). For coding the coefficients, many bits are assigned to the most significant coefficients, fewer bits are assigned to lesser significant coefficients, while no bits at all are assigned to the least significant coefficients; in other words, these least significant coefficients are not transmitted to the decoding station.

In the case of monochrome TV in which the television signal represents only one quantity varying with respect to time, namely the brightness, the basic picture $B(1,1)$ represents the average brightness of the sub-picture and $y(1,1)$ represents its amplitude. This coefficient $y(1,1)$ is usually the most significant and must therefore be encoded with the greatest accuracy. Eight or nine bits appear to be adequate in practice for this purpose. The other coefficients can usually be encoded with not more than five bits.

By suitable choice of the transform, a bit rate can be realized which is still lower than the bit rate which is obtained by means of predictive coding. The transforms most commonly used in this connection are the Hotelling, the Fourier, the Haar, and the discrete cosine transforms.

A sub-picture can be composed in such a way that it comprises pixels of both the even and the odd field of a TV picture. The transform of such a subpicture is sometimes referred to as intraframe transform. It is alternatively possible to compose a subpicture from pixels all of which are either associated with the even or with the odd field of a TV picture. The transform of such a sub-picture is sometimes referred to as intrafield transform.

Although the general impression is that a bit rate reduction which is by all means interesting can be realized by means of an intraframe transform with only a slight loss of picture quality, practice proves that this reduction is only significant if the pictures to be transformed are still pictures. For moving pictures, an intrafield transform is found to be more efficient than an intraframe transform.

OBJECT AND SUMMARY OF THE INVENTION

It is an object of the invention to provide a television system in which transform coding is used and in which a bit rate reduction, which is by all means interesting, can be realized in the case of moving pictures.

According to the invention such a television system is characterized in that in the encoding station, the encoding circuit is provided with a transform circuit having both an intrafield transform mode and an intraframe transform mode, a motion detector to which the picture signal is applied and which supplies an indication signal indicating whether an object in a picture has undergone a displacement during the time between the two successive fields of this picture, which displacement is noticeable within a group of picture signal samples to be transformed, and means for selecting in response to the indication signal, the coefficients obtained by means of the intrafield transform to transmit them to the decoding station if such a displacement has occurred and for selecting the coefficients obtained by means of the intraframe transform to transmit them to the decoding station if such a displacement has not occurred; and in that the decoding station is provided with, an inverse transform circuit using an inverse intrafield transform mode and an inverse intraframe transform mode to which the coefficients are applied; and means for regenerating the indication signal and for selecting in response thereto, and for the purpose of display, the video signal samples obtained in accordance with the inverse intrafield transform, or the video signal samples obtained in accordance with the inverse intraframe transform.

The invention is based on the following recognition. Let it be assumed that an object in a picture is bounded by a vertical line. If this line is moved in the horizontal direction, the parts of the line which are displayed in a given field will be slightly shifted with respect to the parts of the line which are displayed in the immediately preceding field. If such a picture is subjected only to an intraframe transform, much higher order coefficients will have to be taken into consideration than in the case in which no movement has occurred. In fact, the meander-shaped line produced by this movement instead of the straight line can only be reconstructed accurately in the decoding station if the much higher order coefficients are transmitted thereto.

Since such motion effects are not noticeable within a field, they will not become manifest if intrafield transform is used in such a case. In that case, it is not necessary to take into consideration any higher order coefficients than would have been necessary if the picture had been a still picture and if it had been subjected to an intraframe transform. As compared with the situation in which only intraframe transform is used, a satisfactory bit rate reduction is obtained by using the measures according to the invention.

It is to be noted that intraframe transform in still pictures leads to the lowest bit rate. In fact, in the case of intraframe transform not only the correlation between the pixels associated with the same field (two-dimensional correlation) is taken into account, but the correlation between pixels associated with different fields (three-dimensional correlation) is also taken into account.

In the television system described above, the selection of the coefficients which must be transmitted to the decoding station is made by the motion detector. This detector may be adjusted in such a way that upon the slightest movement in the picture, it selects those coefficients which are obtained by means of intrafield transform. It is found that this has a detrimental influence on the number of coefficients to be transmitted and thus on the bit rate. If a given quantity of movement is allowed in the picture before the coefficients obtained by means of intrafield transform, are selected, a smaller increase of the number of coefficients is obtained. To reduce the number of coefficients to be transmitted to a further extent, the encoding circuit of a further embodiment of the television system includes a filtering device for performing a median filtering on the television signal samples of a picture and only output samples of this filtering device are subjected to the intraframe transform.

Such a filtering device is generally known per se. See, for example Reference 3, pages 330-333. It forms a picture from two associated fields in which no motion effects occur.

REFERENCES

1. Picture Coding: A Review; A.N. Netravali, J.O. Limb; Proceedings of the IEEE, Vol. 68, No. 3, March 1980, pages 366-406.
2. Method of an Arrangement for Digitizing a Time-Discrete Video Signal Using a Picture Transform Coding U.S. Pat. No. 4,398,217.
3. Digital Image Processing. W.K. Pratt; A Wiley-interscience publication, J. Wiley and Sons, (ISBN 0-471-01888-0).
4. Videosignal Processing Circuit for Processing an Interlaced Video Signal; EP 0192 292.

DESCRIPTION OF SOME EMBODIMENTS

General Structure of the Television System

Figure 1:
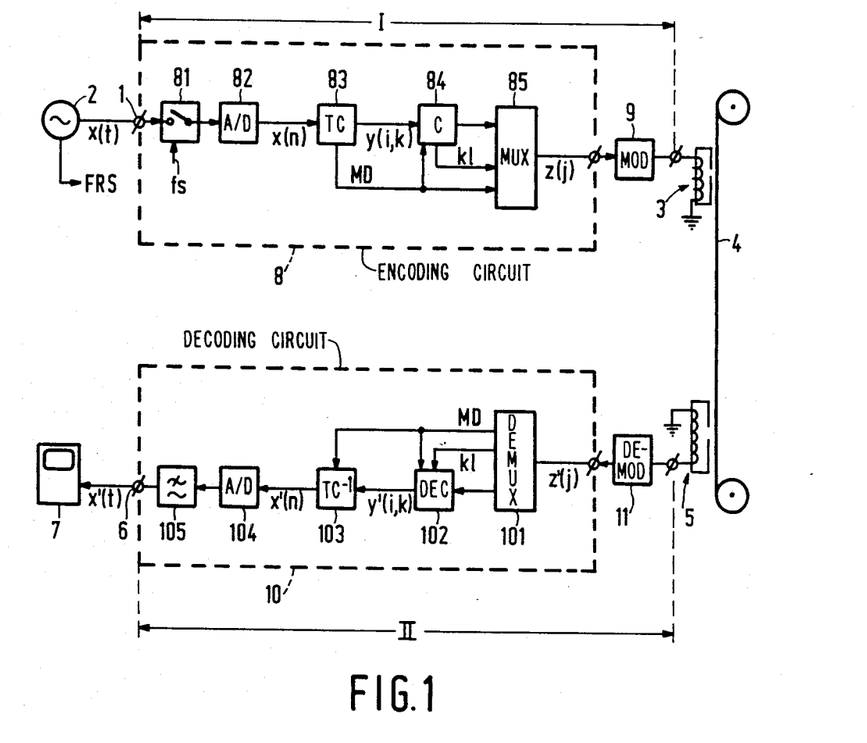
FIG. 1 shows diagrammatically the general structure of a video recorder provided with the television system using transform coding.

FIG. 1 shows diagrammatically a video recorder which is provided with the television system according to the invention. It comprises an encoding station I and a decoding station II. Via an input 1 the encoding station receives an analog picture signal x(t) which is supplied by a picture signal source 2. Furthermore, it is coupled to a magnetic tape 4 by means of a write head 3. The decoding station II is also coupled to the magnetic tape 4, namely by means of a read head 5. This decoding station supplies from its output 6 an analog picture signal x'(t) which is applied to a monitor 7.

The encoding station is provided with an encoding circuit 8 to which the analog signal is applied and which supplies a pulse series z(j) which is recorded on the magnetic tape via a modulation circuit 9 and the write head 3.

Correspondingly, the decoding station is provided with a decoding circuit 10 to which the pulse series z'(j) is applied which is obtained by demodulation, in a demodulator 11, of the signal which is read by the read head 5 from the magnetic tape.

In the encoding circuit 8, the analog picture signal x(t) is first sampled in a sampling circuit 81 having a suitably chosen sampling frequency of approximately 10 MHz by which a series of picture signal samples, or pixels are obtained. These pixels are encoded in an analog-to-digital converter 82 into 8-bit PCM words x(n) and applied to a transform circuit 83 whose structure will be described hereinafter. In this respect it is to be noted that it converts, each time, blocks of NxN pixels x(i,k) of the picture into an equally large block of NxN coefficients y(i,k) and an indication bit MD. More particularly, the block of pixels x(i,k) is subjected to an intrafield transform or to an intraframe transform. The indication bit MD indicates by which transform mode the block of coefficients is obtained. These coefficients as well as the indication bit are subsequently applied to an adaptive encoder 84 for determining which of a number of criteria is satisfied by the block of coefficients. Subsequently, a given number of bits is allocated to each coefficient. This number is dependent on the criterion which is satisfied. Finally, each coefficient is encoded in accordance with the number of bits allocated thereto. The adaptive encoding circuit 84 also supplies one or more classification bits k1 indicating which criterion is satisfied by the group of coefficients. Many embodiments of such adaptive encoding circuits have been described in literature. A special embodiment is described extensively in, for example, Reference 2.

The encoded coefficients, the classification bits k1 and, in the embodiment shown, also the indication bit MD may be applied either separately or in a time-division multiplex format to the magnetic tape. In the latter case, a time-division multiplex circuit 85 will be required which may, however, be formed in a conventional manner and which supplies the pulse series z(j) from its output.

In the decoding circuit 10, the pulse series z'(j) supplied by the demodulator 11 is applied to a demultiplexer 101 which separates the block of encoded coefficients from the associated indication bit MD and the classification bits k1. This block of encoded coefficients the classification bit and, in this embodiment, also the indication bit MD are applied to an adaptive decoding circuit 102 which supplies for each received block of coefficients, a block of coefficients y'(i,k) which corresponds to the block of coefficients y(i,k) supplied by the transform circuit 83. Together with the associated indication bit MD, these coefficients are applied to an inverse transform circuit 103 which, dependent on the indication bit, subjects the block of coefficients y'(i,k) to an inverse intrafield or an inverse intraframe transform. It thereby supplies the picture signal samples x'(n) which are applied to a cascade arrangement of a digital-to-analog converter 104 and a low-pass filter 105 so that the analog picture signal x'(t) is obtained which can be displayed by the monitor 7.

THE TRANSFORM CIRCUIT

As is stated in section E(1), the transform circuit 83 is adapted to subject blocks of NxN pixels to an intrafield or an intraframe transform. An embodiment of such a transform circuit is shown diagrammatically in FIG. 2.

Figure 2:
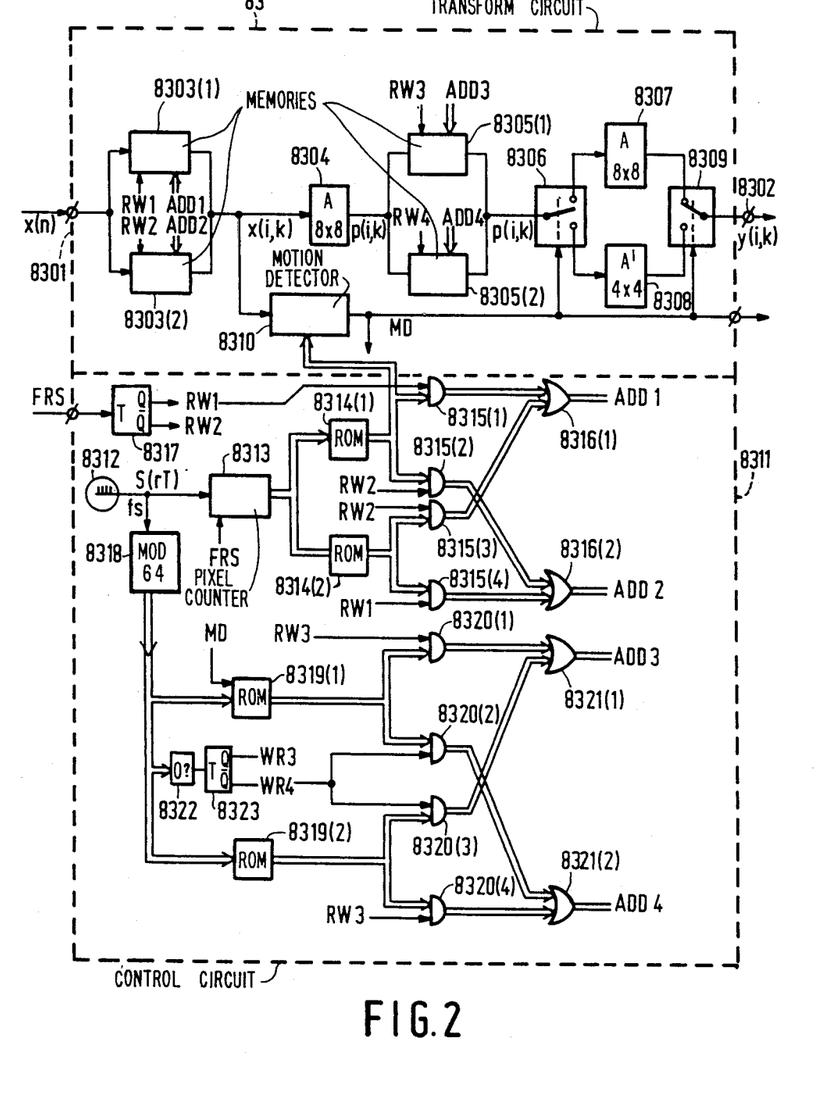
FIG. 2 shows a transform circuit for use in the television system of FIG. 1.

This embodiment is based on the known concept that a block of NxN pixels x(i,k) can be considered as a matrix X and that each basic picture satisfies the relation $$B(i,k) = A_i A_k^T \qquad (1)$$

In this relation A represents a transform matrix; $A_i$ represents a matrix in which each column is equal to the i-th column of the transform matrix A and $A^{Tk}$ represents a matrix each row of which is equal to the k-th row of the matrix A. If also the coefficients y(i,k) are arranged to form a matrix Y, it holds that $$Y = A^T X A \qquad (2)$$

In this expression $A^T$ represents the transposed matrix of A.

For calculating the coefficients in accordance with expression (2) both the original transform matrix A and its transposed version $A^T$ must be available. Expression (2) is, however, equivalent to $$Y^T = (XA)^T A \qquad (3)$$

For this matrix multiplication, only the transform matrix A should be available. More particularly, the product matrix P = XA can be calculated first. Subsequently P can be transposed and finally $Y^T = P^T A$ can be determined.

The embodiment shown in FIG. 2 has an input 8301 to which the pixels x(n) are applied and an output 8302 at which the coefficients y(i,k) occur. Two picture memories 8303(1) and 8303(2) are connected to the input 8301. They are provided with addressable memory locations and are controlled by write/read commands RW1, RW2 in such a way that, for example, the visible pixels of the visible lines of two successive fields of the picture are written into one of them, while simultaneously the pixels of the lines of the two fields of a preceding picture are read in the other picture memory. The address ADD1, ADD2 which is applied to the address input of the relevant picture memory determines in which location in the memory a pixel is stored or which pixel is read.

Figure 3:
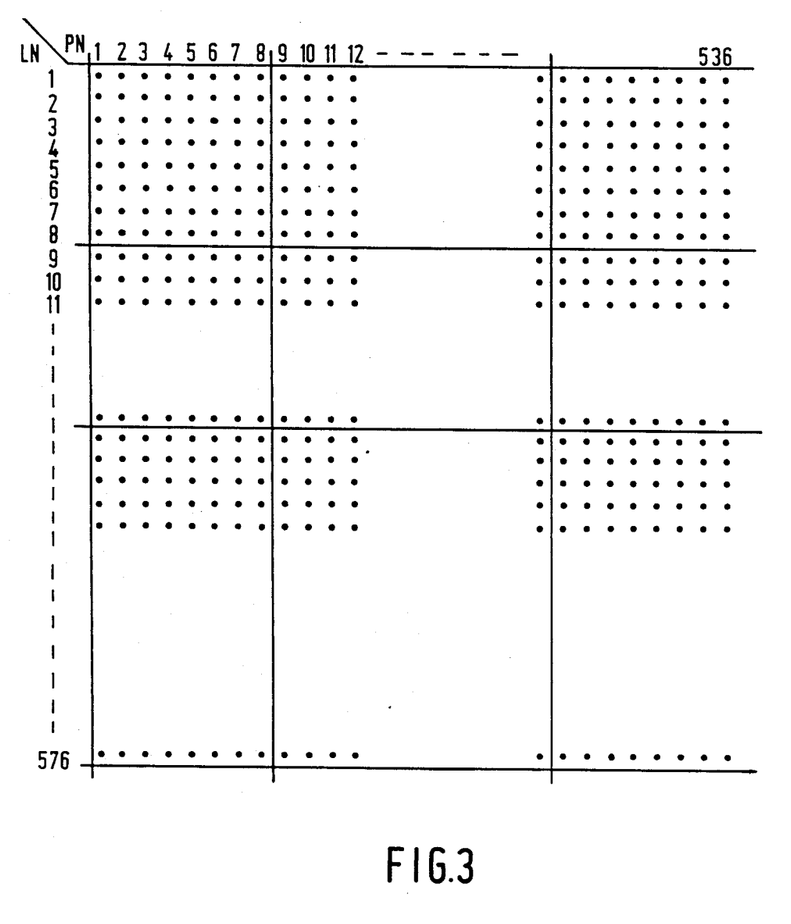
FIG. 3 illustrates a picture built up from pixels and divided into sub-pictures.

More particularly, received visible pixels of the visible picture lines of a picture are written line by line into the picture memory. Firstly, the pixels of the odd lines are stored and then those of the even lines. After all visible pixels of the visible lines of a picture have been received, the picture memory comprises for example, the pixels denoted by dots in FIG. 3. In this FIG. 3 the row numbers LN of the picture memory in which visible pixels of picture lines are written are shown in the vertical direction and the column numbers PN of the picture memory in which visible pixels of the different picture lines are written are shown in the horizontal direction. When reading the contents of the picture memory, each picture is split up into blocks X of NxN pixels x(i,k). Such a split-up is diagrammatically shown for N=8 in FIG. 3.

The pixels of such a block are applied row by row to a transformer 8304. This block X is multiplied therein by the fixed transform matrix A which is preferably the 8x8 matrix of the discrete cosine transform (abbreviated DCT). The product matrix P = XA which comprises the matrix elements p(i,k) is obtained thereby.

Two memories 8305(1) and 8305(2) are connected to the output of the transformer 8304. Like the picture memories 8303(.), they are provided with addressable memory locations and are controlled by write/read commands RW3 and RW4 in such a way that the elements of the product matrix P are written in one of the two memories, whereas the matrix elements of the preceding product matrix P are read in the other memory. More particularly, the matrix elements p(i,k) are written row by row into such a memory. Like the picture memories 8303(.), the location in which a matrix element p(i,k) is stored is again determined by the address ADD3, ADD4, which is then applied to the address input of the relevant memory. This address also determines in which order matrix elements p(i,k) stored in the memory are read.

The outputs of the memories 8305(.) are connected to the input of a switching device 8306 which is shown only symbolically. This device applies all matrix elements of the product matrix read from a memory 8305(.) either to a transformer 8307 or to a transformer 8308. In the former case, the transform circuit is in the intraframe transform mode and an intraframe transform is performed, in the latter case, it is in the intrafield transform mode and an intrafield transform is performed. The outputs of the two transformers 8307 and 8308 are connected to separate inputs of a further switching device 8309 which is shown only symbolically, whose output is connected to the output 8302 of the transform circuit 83 and at which the desired transform coefficients y(i,k) occur.

The switching devices 8306 and 8309 are controlled by a switching signal MD which is supplied by a motion detector 8310 which in this case has its input connected with the input of the transformer 8304. This motion detector ascertains whether an object in the picture has moved during the period between two successive fields and whether anything of this movement is noticeable within a block of 8 x 8 pixels. If the latter is not the case, MD becomes O and the transform circuit acquires the intra-frame transform mode. In this mode, the product elements p(i,k) written row by row into a memory 8305(.) are read column by column so that the product matrix P is transposed. The product elements p(i,k) thus read are applied to the transformer 8307 which has the same structure as the transformer 8304 and which multiplies the 8x8 matrix $P^T$ supplied by the memory 8305 (.) again by the matrix A which is again the 8x8 DCT matrix. Consequently, the product matrix $Y^T = P^T A$ is obtained whose matrix elements y(i,k) represent the required coefficients. It is to be noted that this mode owes its name of intraframe transform mode to the fact that the 8x8 matrix of product elements which is applied to the transformer 8307 has been produced from pixels of both fields of the picture.

Figure 4:
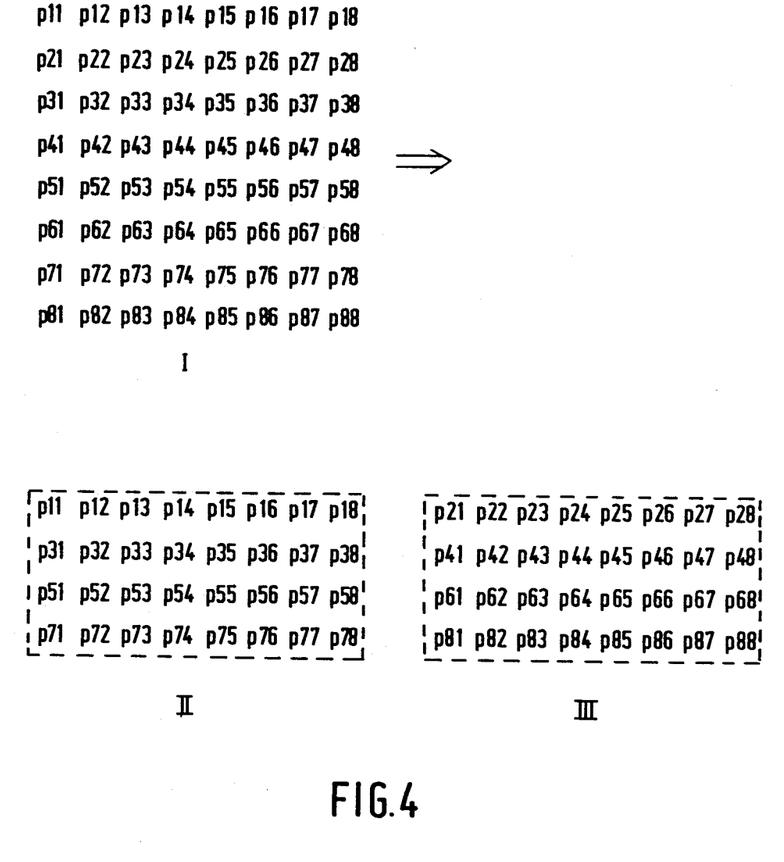
FIG. 4 shows a product matrix and its division into sub-product matrices.

When MD=1, which means that it is noticeable within the block of 8x8 pixels that an object has moved with respect to time between two successive fields, the transform circuit is put to the intrafield transform mode. In this mode the product elements p(i,k) are read in a sequence which is completely different from that in the intraframe transform mode. If a movement is detected in the block of 8x8 pixels, the product matrix P is split up, as it were, as is illustrated in FIG. 4. More particularly, the producct matrix P as supplied by the transformer 8304 and as stored in the memory 8305(.) is indicated at I in FIG. 4. This product matrix P is first subjected to an imaginary split-up into a 4 x 8 matrix consisting of the product elements of the odd lines, as is indicated at II in FIG. 4 and into a 4 x 8 matrix consisting of the product elements of the even lines as is indicated at III in FIG. 4. These 4 x 8 matrices are subsequently applied one after the other and column by column to the transformer 8308 with which a 4 x 4 DCT matrix A' is now associated. By multiplication of each of the two 4x8 sub-product matrices by the 4x4 DCT matrix A', two groups of 32 coefficients each are obtained which are applied via the switching device 8309 to the output 8302. As may be evident from the foregoing, the two fields of a block are now separately subjected to a transform and hence the name intrafield transform mode. The values of the coefficients obtained thereby are not influenced by motion effects in the picture. Consequently, of the total number of 64 coefficients into which a block of 8x8 pixels is transformed, fewer coefficients need to be transferred as compared with the case if this product matrix P were to be subjected to an intraframe transform.

A control circuit 8311 is provided for controlling the transform circuit 83 shown in FIG. 2. This circuit comprises a clock pulse generator 8312 which supplies clock pulses S(rT) at a rate $f_s$ which are applied as sampling pulses to the sampling device 81 (FIG. 1), on the one hand, and to a pixel counter 8313, on the other hand, whose counting position ranges from zero to a number which is equal to the number of pixels constituting a full picture. Upon the commencement of each new picture, this counter is reset by frame reset pulses FRS which are supplied by the video source 2 (FIG. 1). The counting positions of this pixel counter 8313 are applied as addresses to the address inputs of two memories 8314(.) which may each be formed as ROMs. More particularly, the ROM 8314(1) supplies the addresses for the picture memories 8303(.) in the sequence in which pixels must be read, the so-called read addresses, while the ROM 8314(2) supplies the addresses for the picture memories 8303(.) in the sequence in which pixels must be written into these picture memories, the so-called write addresses.

The addresses supplied by these ROMs 8314(.) are applied via AND gate circuits 8315(.) and OR gate circuits 8316(.) to the address inputs of the picture memories 8303(.). In order to achieve that the read and write addresses applied to a picture memory 8303(.) alternate with each new picture, the picture reset pulses FRS are applied to a T flipflop 8317. The Q output thereof supplies the read/write command RW1 and its $\overline{Q}$ output supplies the read/write command RW2. These write-/read commands are also applied to the AND gate circuits 8315(.).

For generating the read and write addresses for the memories 8305(.), the clock pulses S(rT) are also applied to a counting circuit 8318, for example a modulo-64-counter. The counting positions of this circuit are applied to address inputs of memories 8319(.) which may also be in the form of ROMs. A further address input of ROM 8319(1) also receives the signal MD which is supplied by the motion detector 8310. The ROM 8319(.) supplies the read addresses for the memories 8305(.) and the ROM 8319(2) supplies the write addresses. If MD=0 (no motion detected) the series of addresses supplied by this ROM 8319(1) differs from the series of addresses which it supplies if MD=1 (motion detected).

These read and write addresses are applied via AND gate circuits 8320(.) and OR gate circuits 8321(.) to address inputs of the memories 8305(.). In order to achieve that the read and write addresses applied to a memory 8305(.) alternate whenever 64 product elements are read from the memory or are written in the memory, the counting positions of counter 8318 are applied to an encoding network 8322 which supplies a pulse whenever the counting circuit assumes the counting position of zero. These pulses are applied to a T flipflop 8323. The Q output thereof supplies the read/-write command RW3 and the $\overline{Q}$ output supplies the read/write command RW4.

The transformers 8304, 8307 and 8308 can be implemented in a manner which is known in this technical field, but preferably in the manner as extensively described in the prior Netherlands patent application No. 8,601,183 (PHN 11.745) in the name of the Applicant.

Figure 5:
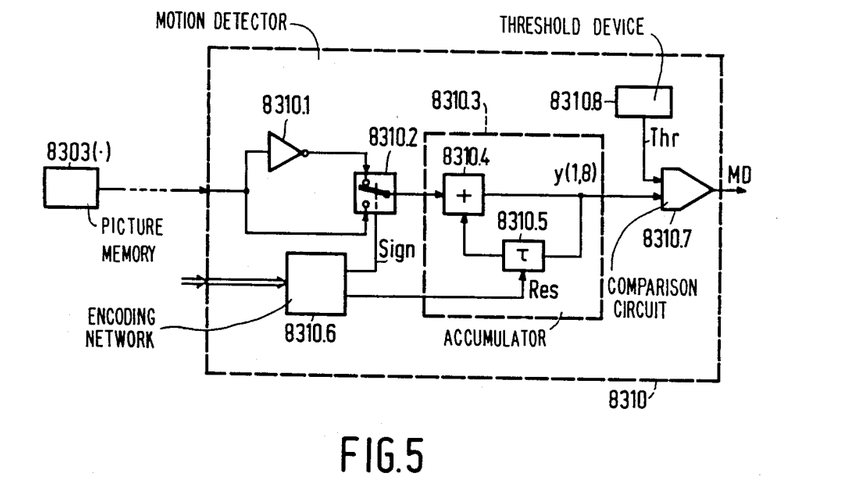
FIG. 5 shows a motion detector for use in the transform circuit of FIG. 2.
Figure 6:
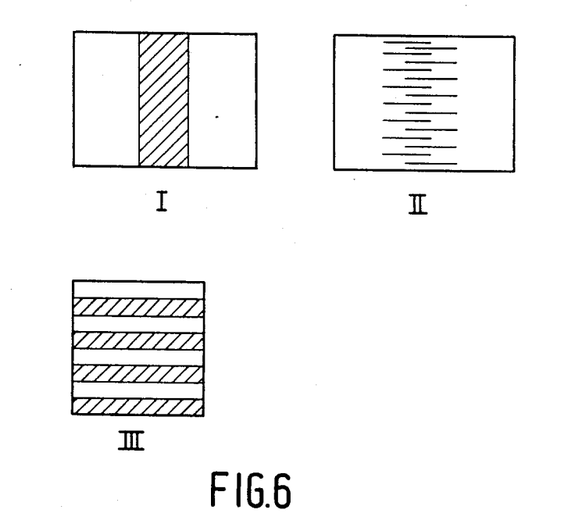
FIG. 6 shows some sub-pictures for explaining the operation of the motion detector shown in FIG. 5.

For the sake of completeness, an embodiment of a motion detector is shown in FIG. 5 and it is based on a frequency measurement in the vertical direction. The fact that this may be a measure of the presence of motion is shown in FIG. 6. The picture supplied by a video camera if it is directed to a vertically oriented object, for example the stem of a tree is indicated at I in FIG. 6. When the camera moves significantly in the horizontal direction, a picture having the line structure shown at II in FIG. 6 is produced. This structure is brought about because first the odd lines and then the even lines of the picture are scanned. Such a line structure is also noticeable for local details in the video picture, thus also in sub-pictures of 8x8 pixels.

The high vertical frequency obtained by this line structure can be measured by subjecting this sub-picture to a Fourier transform. However, it is simpler to subject such a sub-picture to a Hadamard transform in which case the presence of the highest vertical frequency is represented by the value of the coefficient y(1, 8) which indicates the contribution of the basic picture B(1,8) shown at III in FIG. 6. As can easily be derived from the expressions (2) and (3), the coefficient y(1,8) follows from the relation $$y(1,8) = \sum_{i=1}^{8} \sum_{k=1}^{8} (-1)^{i+1} x(i,k)$$

For determining this coefficient, the pixels read from picture memory 8303(.) are applied directly or after polarity inversion in an inverter stage 8310.1 via a switching device 8310.2, which is shown only symbolically, to an accumulator 8310.3. This accumulator supplies the said coefficient y(1,8) and is formed in known manner from an adding device 8310.4 and a delay element 8310.5. This motion detector also comprises an encoding network 8310.6 which receives the read addresses from the memory 8314(1) (see FIG. 2). It supplies two signals Sign and Res which are applied to the switching device 8310.2 and the delay element 8310.5, respectively. The signal Res mainly has the value of zero except when the received address is such that the read-out of the pixels of a new sub-picture is started. In that case Res=1 so that the delay element 8310.5 is reset. The signal Sign alternately assumes the value of zero and the value of one. If Sign=1, the polarity-inverted pixels are applied to the accumulator. If, on the other hand, Sign=0 the pixels are directly applied to the accumulator. More particularly, Sign=0 for the read addresses of the pixels in the odd rows of the subpicture, whereas Sign=1 for the read addresses of the pixels in the even rows of the sub-picture.

The coefficient y(1,8) thus obtained is further compared in a comparison circuit 8310.7 with a predetermined threshold value Thr which is supplied by a threshold device 8310.8. This comparison circuit 8310.7 supplies the motion detection signal MD which has the value of zero when the coefficient is smaller than the threshold value and which has the value of one in the opposite case.

In the transform circuit 83 which is shown in FIG. 2, the motion detector 8310 indicates how a block of pixels must be treated. In other words, whether it must be subjected either to an intraframe transform or to an intra-field transform. In order to prevent motion defects, the motion detector must be highly sensitive. This means that, for example, in the motion detector shown in FIG. 5, the threshold Thr of the threshold device 8310.8 must be low. The result thereof is that the decision to perform intrafield transform can be more rapidly taken than would be desirable for reasons of efficiency.

Figure 7:
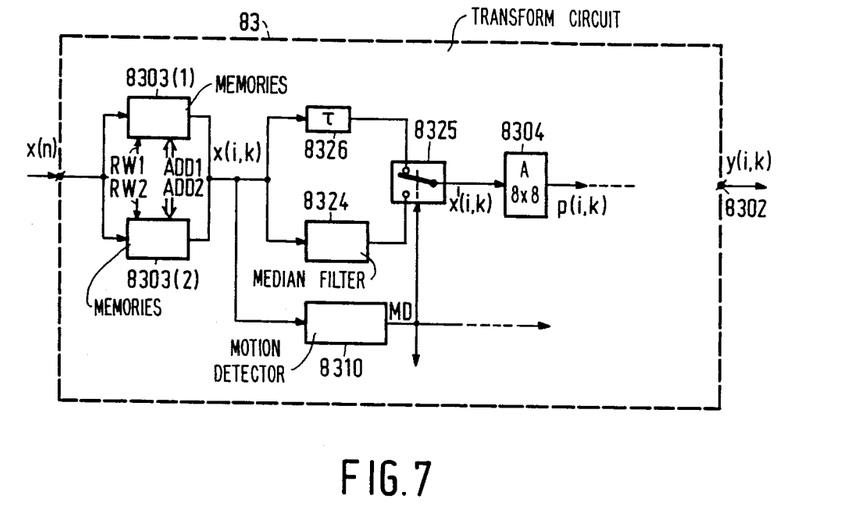
FIG. 7 shows the use of a median filter in the transform circuit of FIG. 2.

To prevent this, the pixels which are read from a picture memory 8303(.) are applied to the transformer, as is shown in FIG. 7, either via a so-called median filter 8324 and a switching device 8325 (which is shown only symbolically in FIG. 7), or via a delay line 8326 and the switching device 8325. The delay time of the delay line 8326 is equal to the time delay which is introduced by the median filter.

Switching device 8325 is controlled by the output signal MD of the motion detector 8310 in such a manner that the output signal of the median filter 8324 is applied to the transformer 8304 if there is no or only little motion and the output signal of the delay line 8326 is applied to the transformer if there is significant motion.

Median filters are very well known in this technical field. A general description is given on pages 330–333 of Reference 3 and implementations have extensively been described in Reference 4. For the sake of completeness, it is to be noted in this respect that of, for example, three pixels located one over the other in a sub-picture, this median filter applies that pixel to its output whose value is located closest to the mean value of the three pixels. This median filter thus performs a median filtering on two successive fields of a picture. Thus it supplies a picture which looks like a display of a still. The pixels supplied by this filter are therefore only subjected to an intraframe transform.

A special situation occurs when the video signal source 2 supplies a video signal which is obtained by scanning the pictures of a film. In that case it is known a priori that groups of two successive fields do not exhibit any motion effects. This means that the motion detector 8310 will only detect motion in one out of two successive fields. In this particular case, the transform circuit can be set to the intraframe transform mode by the user or the circuit can be automatically set to this mode.

THE ADAPTIVE ENCODER

The adaptive encoder 84 shown in FIG. 1 may have many forms. A very favorable embodiment is extensively described in Reference 2, but in this respect it will only be described with reference to FIG. 8 for the sake of completeness. It has an input 8401 which receives the coefficients y(i,k) of a block, which coefficients are, in this connection, assumed to be occurring one after the other. They are applied to a variable word-length encoder 8402 which converts each coefficient into a code word of suitable word length. This word length is determined by a bit allocation element $b_j(i,k)$ which is applied via a control input 8403 to this encoder 8402. The variable word-length encoder applies code words which vary in length to the output 8404 of the encoding circuit.

Figure 8:
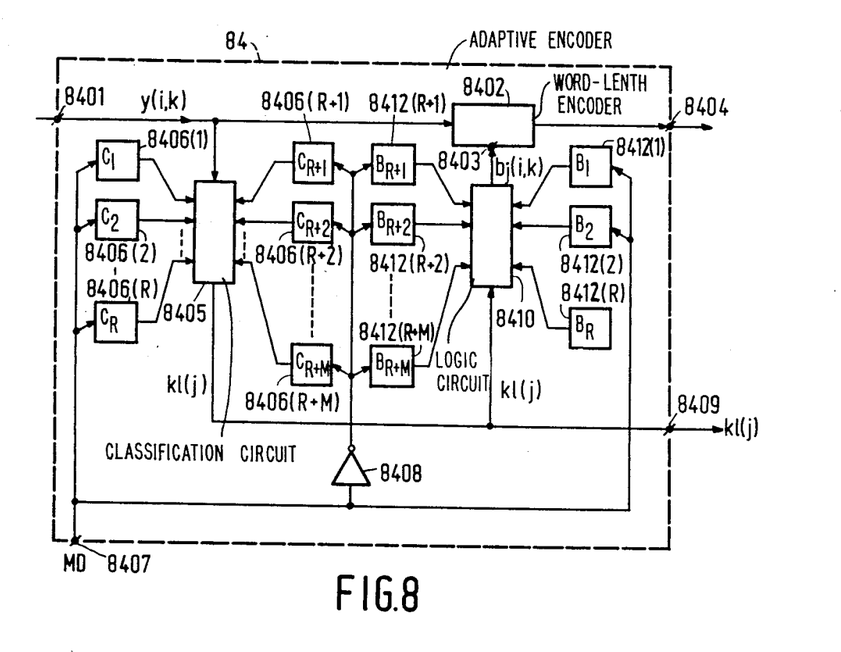
FIG. 8 shows an adaptive encoder for use in the encoding circuit of the system shown in FIG. 1.

The coefficients y(i,k) are not only applied to this variable word-length encoder 8402 but also to a comparison and classification circuit 8405. A plurality of memories 8406(.) are connected to this circuit. A classification group is stored in each memory. More particularly, the memory 8406(j) of ordinal number j comprises the classification group $C_j$ with classification elements $c_j(i,k)$. The memories are split up into two groups. The first group comprises the memories 8406(1) to 8406(R) and the second group comprises the memories 8406(R+1) to 8406(R+M). The contents of the memories 8406(1) to 8406(R) can only be read if motion has been detected in the sub-picture, i.e. when MD=1, and the contents of the memories 8406(R+1) to 8406(R+M) can only be read if no motion has been detected in the sub-picture, i.e. when MD=0. To this end, this indication bit MD is received at an input 8407 and is applied directly to the read-enable inputs of the memories 8406(1) to 8406(R+1) and via an inverter 8408 to the read-enable inputs of the memories 8406(R+1) to 8406(R+M).

The classification groups $C_1$ to $C_R$ each comprise (NxN) 2=(32) classification elements and the classification groups $C_{R+1}$ to $C_{R+M}$ each comprise N x N=64 classification elements. Preferably it further holds that a classification element $c_j(i,k)$ in a classification group $C_j$ is smaller than the corresponding classification element $C_{j+1}(i,k)$ in the classification group $C_{j+1}$.

In the comparison and classification circuit 8405, that classification group is determined for which it holds that each classification element $c_j(i,k)$ is larger than the corresponding coefficient $y(i,k)$ of the group of coefficients. In this connection "corresponding" means that the "coordinates" i,k of the coefficient $y(i,k)$ are equal to the coordinates i, k of the classification element $c_j(i,k)$ in the j-th classification group with which the coefficient is compared. The circuit 8405 supplies the ordinal number j of the relevant classification group as a classification word k1(j).

This classification word is applied, on the one hand, to the output 8409 of the encoding circuit 84 and, on the other hand, to a logic circuit 8410. A plurality of memories 8412(.) is also connected thereto. A bit allocation group is stored in each memory. More particularly, the memory 8412(j) with ordinal number j comprises the bit allocation group $B_j$ with bit allocation elements $b_j(i,k)$. These memories are also split up in two groups. The first group comprises the memories 8412(1) to 8412(R) and the second group comprises the memories 8412(R+1) to 8412(R+M). The contents of the memories 8412(1) to 8412(R) can only be read if MD=1 and the contents of the memories 8412(R+1) to 8412(R+M) can only be read if MD=0.

The bit allocation groups $B_1$ to $B_R$ each comprise (NxN) /2 (=32) bit allocation elements and the bit allocation groups $B_{R+1}$ to $B_{R+M}$ each comprises NxN (=64) bit allocation elements.

In the logic circuit 8410 the classification word k1(j) applied thereto ensures selection of the bit allocation group $B_j$ associated with the classification group $C_j$, whereafter the elements $b_j(i,k)$ of this group are applied one after the other to the variable word-length encoder 8402.

As is apparent from the foregoing, the classification word k1(j) indicates implicitly that the switching signal MD supplied by the motion detector is equal to one or zero. Therefore this switching signal itself need not necessarily be transferred to the decoding station.

THE INVERSE TRANSFORM CIRCUIT

For regaining the original video signal samples, the decoding circuit 10 (see FIG. 1) is provided with an inverse transform circuit using an inverse intrafield transform mode and an inverse intraframe transform mode. It receives each group of coefficients supplied by the encoding circuit 8 and subjects them to an inverse intra-field transform and/or an inverse intraframe transform. Dependent on the switching signal MD which is also received, the video signal samples obtained in accordance with the inverse intraframe transform or in accordance with the inverse intraframe transform are selected for display.

An embodiment of such an inverse transform circuit is obtained by inverting the signal direction in the transform circuit 83 shown in FIG. 2, by omitting the motion detector 8310 and by interchanging the read commands with the write commands for the different memories.

It is to be noted that if the switching signal MD itself is not transferred, it can be generated in the decoding station by means of a comparison circuit which supplies a signal MD=1 whenever the classification word k1(j) corresponds to one of the classification groups $C_1$ to $C_R$, and a signal MC=0 whenever the classification word correspond to one of the classification groups $C_{R+1}$ to $C_{R+M}$.

What is claimed is:

1. A television system in which digitized television signals are transmitted from an encoding station to a decoding station, in which the encoding station is provided with an encoding circuit to which the picture signal is applied and which is adapted to perform a transform coding in which groups of picture signals samples are converted into respective groups of coefficients which are transmitted to the decoding station, in which said decoding station is provided with a decoding circuit which is adapted to subject each received group of coefficients to an inverse transform for converting said group of coefficients into a group of picture signal samples which corresponds to the original group of picture signal samples, characterized in that the encoding circuit is provided with a transform circuit having both an intrafield mode and an intraframe transform mode, a motion detector to which the picture signal is applied and which supplies an indication signal indicating whether an object in a picture has undergone a displacement during the period between the two successive fields of this picture which displacement is noticeable within a group of picture signal samples to be transformed, and means for selecting, in response to the indication signal, the coefficients obtained by means of the intrafield transform mode to transmit them to the decoding station if such a displacement has occurred and for selecting the coefficients obtained by means of the intraframe transform mode to transmit them to the decoding station if such a displacement has not occurred; and in that the decoding circuit is provided with an inverse transform circuit using an inverse intrafield transform mode and an inverse intraframe transform mode to which the coefficients are applied, and means for regenerating the indication signal and for selecting in response thereto, and for the purpose of display, the video signal samples obtained in accordance with the inverse intrafield transform mode, or the video signal samples obtained in accordance with the inverse intraframe transform mode.

2. An encoding station for use in a television system as claimed in claim 1, and provided with an encoding circuit to which a picture signal is applied and which is adapted to perform a transform in which groups of picture signal samples are converted into respective groups of coefficients for transmission to a decoding station, characterized in that the encoding station is provided with, a transform circuit having both an intrafield transform mode and an intraframe transform mode, a motion detector to which the picture signal is applied and which supplies an indication signal indicating whether an object in a picture has undergone a displacement during the period between two successive fields of this picture which displacement is noticeable within a group of picture signal samples to be transformed, and means for selecting, in response to the indication signal, the coefficients obtained by means of the intrafield transform to transmit them to the decoding station if such a displacement has occurred and to select the coefficients obtained by means of the intraframe transform to transmit them to the decoding station if such a displacement has not occurred.

3. An encoding station as claimed in claim 2, characterized in that the encoding circuit is also provided with a filtering device for performing a median filtering on two successive fields of a picture and in that the output samples of said filtering device are subjected only to the intraframe transform.

4. A decoding station for use in a television system as claimed in claim 1, which decoding station is provided with a decoding circuit adapted to subject each group of coefficients received to an inverse transform for converting said group of coefficients into a group of picture signal samples which corresponds to the original group of picture signal samples, characterized in that the decoding circuit is provided with, an inverse transform circuit using an inverse intra-field transform mode and an inverse intraframe transform mode to which the received groups of coefficients, are applied and means for generating the indication signal and for selecting in response thereto, and for the purpose of display, the video signal samples obtained in accordance with the inverse intrafield transform or the video signal samples obtained in accordance with the inverse intraframe transform.

5. A decoding station for the reception of groups of coefficients which are supplied by an encoding station as claimed in claim 2, which decoding station is provided with a decoding circuit adapted to subject each group of coefficients received to an inverse transform for converting said group of coefficients into a group of picture signal samples which corresponds to the original group of picture signal samples, characterized in that the decoding circuit is provided with, an inverse transform circuit using an inverse intrafield transform mode and an inverse intraframe transform mode to which the received groups of coefficients, are applied and means for generating the indication signal and for selecting in response thereto, and for the purpose of display, the video signal samples obtained in accordance with the inverse intrafield transform or the video signal samples obtained in accordance with the inverse intraframe transform.

6. A decoding station for the reception of groups of coefficients which are supplied by an encoding station as claimed in claim 3, which decoding station is provided with a decoding circuit adapted to subject each group of coefficients received to an inverse transform for converting said group of coefficients into a group of picture signal samples which corresponds to the original group of picture signal samples, characterized in that the decoding circuit is provided with, an inverse transform circuit using an inverse intrafield transform mode and an inverse intraframe transform mode to which the received groups of coefficients, are applied and means for generating the indication signal and for selecting in response thereto, and for the purpose of display, the video signal samples obtained in accordance with the inverse intrafield transform or the video signal samples obtained in accordance with the inverse intraframe transform.

* * * * *